United States Patent [19]

Takashima

[11] Patent Number: 5,065,398
[45] Date of Patent: Nov. 12, 1991

[54] TDMA SATELLITE COMMUNICATION METHOD AND SYSTEM

[75] Inventor: Hideo Takashima, Yokohama, Japan
[73] Assignee: Hitachi, Ltd., Tokyo, Japan
[21] Appl. No.: 352,029
[22] Filed: May 15, 1989

[30] Foreign Application Priority Data

May 16, 1988 [JP] Japan .................. 63-117110

[51] Int. Cl.$^5$ .............................. H04J 3/26
[52] U.S. Cl. ...................... 370/94.1; 370/97
[58] Field of Search .............. 370/94.1, 95.1, 95.3, 370/104.1, 17, 97

[56] References Cited

U.S. PATENT DOCUMENTS

| | | | |
|---|---|---|---|
| 4,298,979 | 11/1981 | Dobyns | 370/95.3 |
| 4,553,234 | 11/1985 | Brandsma | 370/85.15 |
| 4,745,599 | 5/1988 | Raychaudhuri | 370/93 |
| 4,866,702 | 9/1989 | Shimizu | 370/94.3 |
| 4,888,769 | 12/1989 | Decl | 370/95.3 |

OTHER PUBLICATIONS

R. J. Deasington, X-25 Explained: Protocols for Packet Switching Networks, 1985, pp. 32-38.
A. Fujii et al, "AA/TDMA-Adaptive Satellite Access Method for Mini-Earth Station Networks", Conf. Record, Globe Com. '86, pp. 1494-1499, Houston, Tex., Dec. 1986.
D. Raychaudhuri et al, "Channel Access Protocols for Ku Band VSAT Networks: A Comparative Evaluation", IEEE Communications Magazine, vol. 26, No. 5, pp. 34-44, May, 1988.
N. Abramson, "Packet Switching With Satellites", National Computer Conference, 1973, pp. 695-702.

Primary Examiner—Douglas W. Olms
Assistant Examiner—Melvin Marcelo
Attorney, Agent, or Firm—Antonelli, Terry, Stout & Kraus

[57] ABSTRACT

A subpacket control system used in a time division multiple access system in which a hub station communicates with a plurality of terminal stations via a satellite. When a datum to be transmitted from a terminal station to a hub station has a length exceeding one slot length, the datum is divided into subpackets each having one time slot length, and subpacket information indicating the sequential number of each subpacket in the subpackets is added to the subpacket. A plurality of subpackets are transmitted to the hub station without waiting for a return of an answer back with respect to a first subpacket. On the basis of the subpacket information, the hub station controls reservation access permission.

17 Claims, 13 Drawing Sheets

PACKET CONTENTS IN CASE OF A SHORT DATUM

PACKETS FOR LONG DATUM

PACKETS FOR EMERGENCY DATUM

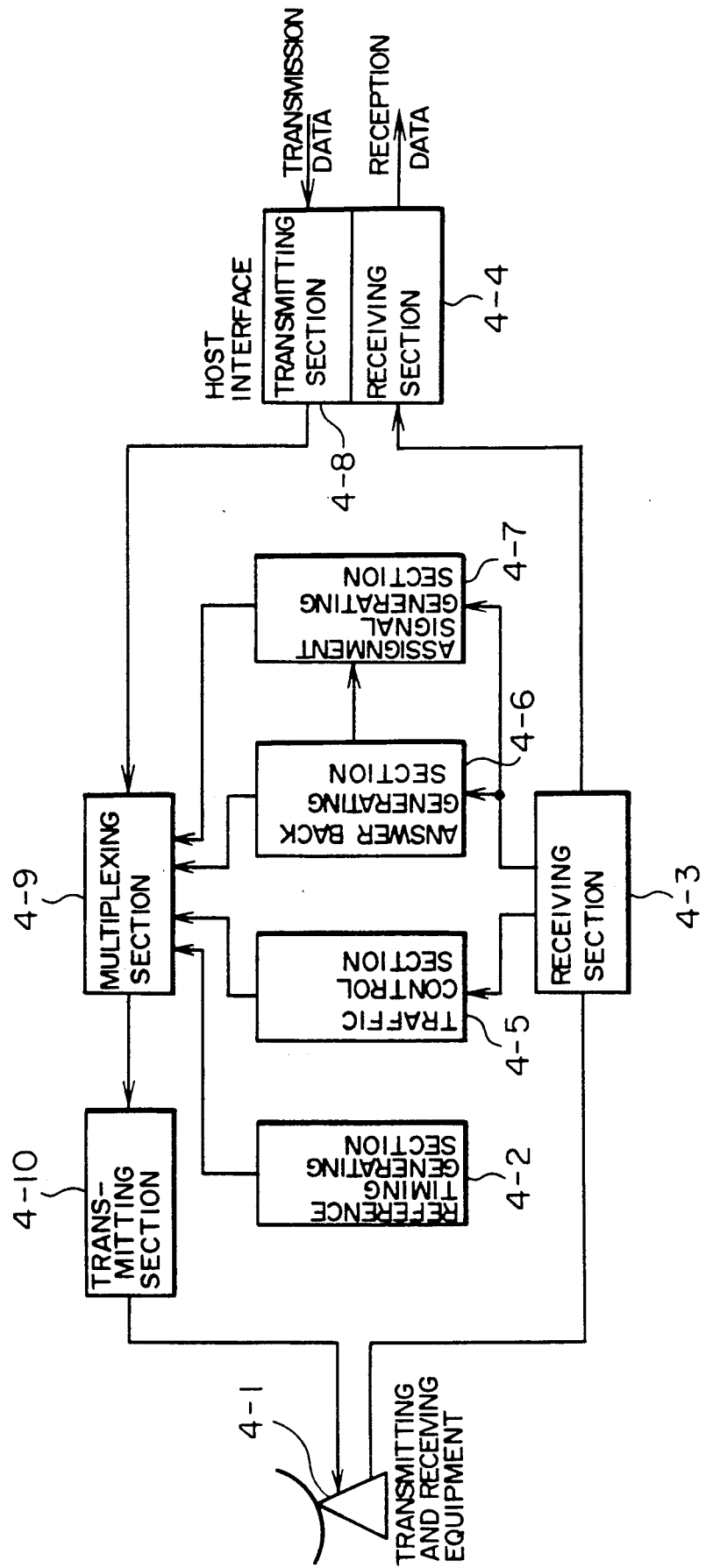

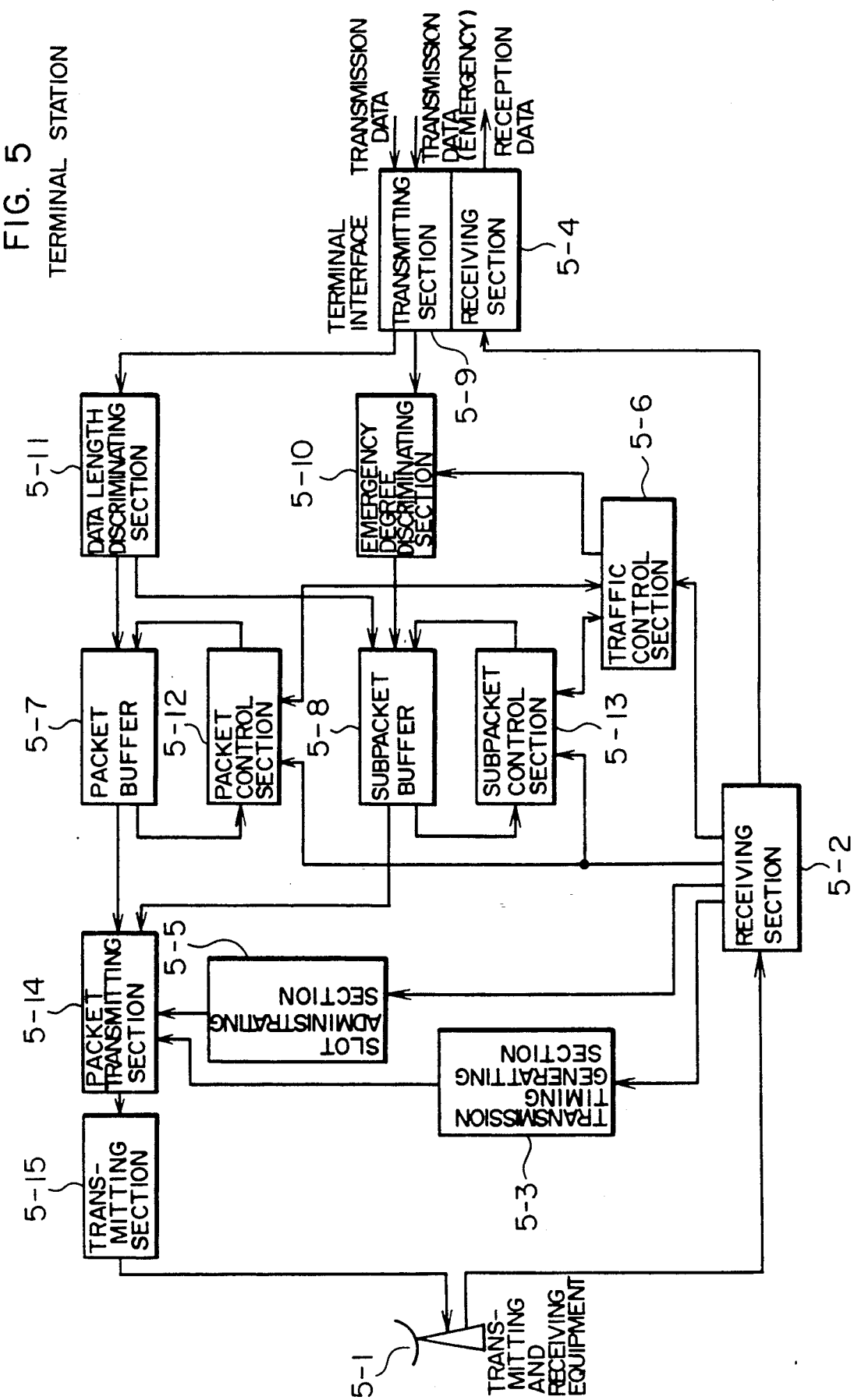

CASE OF LONG DATUM

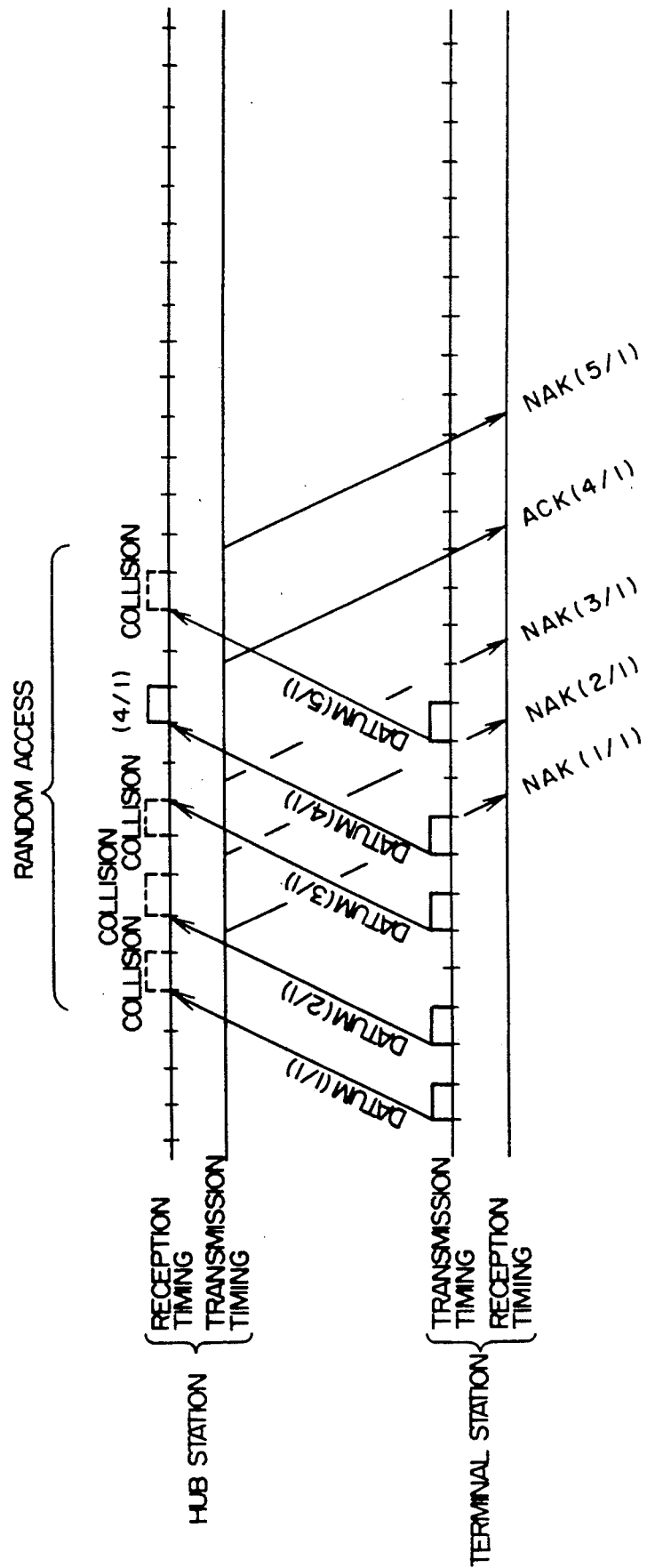

1

TDMA SATELLITE COMMUNICATION METHOD AND SYSTEM

BACKGROUND OF THE INVENTION

The present invention relates to a multiple access system used in a star type satellite communication system comprising a satellite, one center station (hereafter referred to as a hub station) having a hub function with respect to a large number of small remote earth stations (hereafter referred to as terminal stations) which are respectively connected to individual user terminals via terrestrial cable and which communicate with the hub station via the satellite. In particular, the present invention relates to the improvement of a random access system (RA)/TDMA system) which is one the of time division multiple access (TDMA) systems which can extend from terminal stations to a hub station.

Slotted/Unslotted TDMA using a satellite, reservation, and data retransmission in communication between a hub station and a terminal station are described in the following literature:

(1) A. Fujii et. al., "AA/TDMA-ADAPTIVE SATELLITE ACCESS METHOD FOR MINI-EARTH STATION NETWORKS", Conf. Record, GLOBECOM '86, pp. 1494-1499, Houston, TX. Dec. 1986;

(2) D. Raychaudhuri et al., "Channel Access Protocols for Ku-band VSAT Networks: A Comparative Evaluation", IEEE Communications Magazine, Vol. 26, No. 5, pp. 34-44, May 1988;

(3) N. Abramson, "Packet switching with satellites", National Computer Conference, 1973, pp. 695-702.

(4) Raychaudhuri, "Random Access Communication System with contention Scheduling of Subpacketized Data Transmission and Scheduled Retransmission of Unsuccessful Subpacket", U.S. Pat. No. 4,745,599, issued on May 17, 1988.

Typical forms of the random access scheme are the following two schemes: a pure random access scheme and a slotted random access scheme.

When accepting a datum for transmission from a terminal connected with a station in the pure random access scheme, respective stations transmit data formed into data packets on satellite channels without any attempt to coordinate such transmission with transmissions of other stations. In this scheme, data packets, which are transmitted from respective stations and which are not synchronized with each other, often partially overlap and interfere with each other on the satellite, resulting in destroyed data. On the other hand, a slotted random access scheme has a lower probability of data destruction compared to the above-mentioned pure, namely, unslotted random access scheme. In this scheme, each terminal station transmits data packets in synchronization with a time reference as transmitted from the hub station in order to avoid partial overlap. Supposing in consideration of a difference between the two schemes that the data length is constant and data are generated in accordance with the Poisson's process, the throughput, which is the transmission efficiency or the throughput efficiency, is approximately 37%, or approximately twice in the slotted random access scheme as compared with approximately 18% in the unslotted random access scheme. The throughput is expressed in an average percent of channel capacity carrying actual user data. In the slotted random access scheme, the terms "collision" and "collide" are often used instead of the terms "interference" and "interfere".

In the above described slotted random access scheme, however, further improvement of the throughput is desired. When data destruction due to collision of data packet occurs stochastically, the data must be retransmitted and hence the average delivery time of data becomes longer. Especially in the case of a transmission method in which a datum exceeding the time slot length is divided into a plurality of time slot length data and a second divided datum is transmitted after ascertaining reception of the answer back of the signal acknowledging of a first transmitting divided datum the delivery time of all the divided datum becomes longer. For a system requiring running with a high throughput and a system in which long data exceeding the time slot length must be accurately delivered in a short time, a reservation scheme obtained by incorporating a time slot reservation function into the conventional slotted random access scheme is considered.

The reservation scheme is basically a scheme in which time slot reservation is performed by some method before data transmission. The reservation schemes are roughly classified in accordance by way of reservation into two kinds of reservation schemes, i.e., an explicit reservation scheme and an implicit reservation scheme. In the explicit reservation scheme, time slot reservation is performed by using a reservation packet. In the implicit reservation scheme, a reservation packet is not used and once a data packet has been delivered successfully without collision, identical time slots in succeeding frames are regarded as automatically reserved. The term "reservation scheme" typically refers to the explicit reservation scheme. The present invention also refers to the explicit reservation scheme.

When data are emergently transmitted from a terminal station to the hub station by using the conventional slotted random access scheme and data cannot be successfully received by the hub station due to collision of the emergent data packet, the data are retransmitted until the emergency data can be successfully received by the hub station.

When a reservation scheme based upon the above described conventional slotted random access scheme is used and the necessity of reservation occurs at a terminal station, one packet used exclusively for a reservation request or one packet with reservation request information added must first be transmitted. In case the reservation packet cannot be successfully received by the hub station due to collision, the reservation packet must be retransmitted from the terminal station many times until the reservation packet can be successfully received by the hub station. This results in a problem that additional time is required for that purpose.

The similar necessity holds true for emergency data transmission as well. Until an emergency data packet can be successfully received by the hub station, the emergency data packet must be retransmitted from a terminal station many times, resulting in the problem of additional time requirements.

SUMMARY OF THE INVENTION

An object of the present invention is to shorten the time taken until a reservation packet or an emergency data packet transmitted from a terminal station in the slotted random access scheme is successfully received by a hub station without collision.

Another object of the present invention is to increase the probability that at least one emergency datum out of the plurality of emergency data is successfully received at the hub station and to shorten the delivery time of the emergency data.

In order to attain the above described objects, if a packet datum transmitted from a terminal station to a hub station via a satellite is 2 time slots or more in length in the system according to the present invention, the packet datum is divided into subpackets which each have a length of one time slot, and a header and subpacket information with a sequential number and a number of subpackets resulting from a division are added to the subpacket and transmitted separately, respectively. On the basis of this subpacket information, reservation access is permitted at the hub station.

In addition, emergency data to be transmitted in a hurry without any collision are copied to produce a plurality of subpackets and the subpackets are transmitted respectively, separately.

By dividing data to be transmitted into a plurality of subpackets and then transmitting the subpackets, the hub station can be accessed in the same way as the conventional scheme wherein a plurality of reservation packets are transmitted.

By adding subpacket information to each subpacket, the hub station can discriminate the number of subpackets which could not be successfully received and the number of subpackets which have not yet been transmitted and can perform time slot assignment for reservation access.

By copying an emergency datum and transmitting the datum as a plurality of subpackets, the probability of successfully receiving an emergency datum by the hub station is significantly raised.

(a) Since a long datum is divided into subpackets and the subpackets are transmitted separately by using the slotted random scheme, the same effect as that of a conventional example in which a plurality of reservation packets are transmitted is obtained.

(b) Since the reservation packet contains the transmission data as well, the hub station may perform a time slot assignment for subpackets which could not be successfully reserved and subpackets which have not been transmitted yet.

(c) If all of the packets thus divided are transmitted separately and all of them can be successfully received at the hub station, time slot assignment is not necessary.

For these three reasons, the effect of shortening of the delivery time of a long datum can be sufficiently expected.

BRIEF DESCRIPTION OF THE DRAWINGS

FIG. 4 is a block configuration diagram of a hub station 2—2.

FIG. 5 is a block configuration diagram of a terminal station 2—3.

FIGS. 6A and 6B are diagrams used for explaining communication procedure according to an embodiment of the present invention.

DESCRIPTION OF PREFERRED EMBODIMENTS

An embodiment of the present invention will now be described by referring to drawings.

Figure 1:
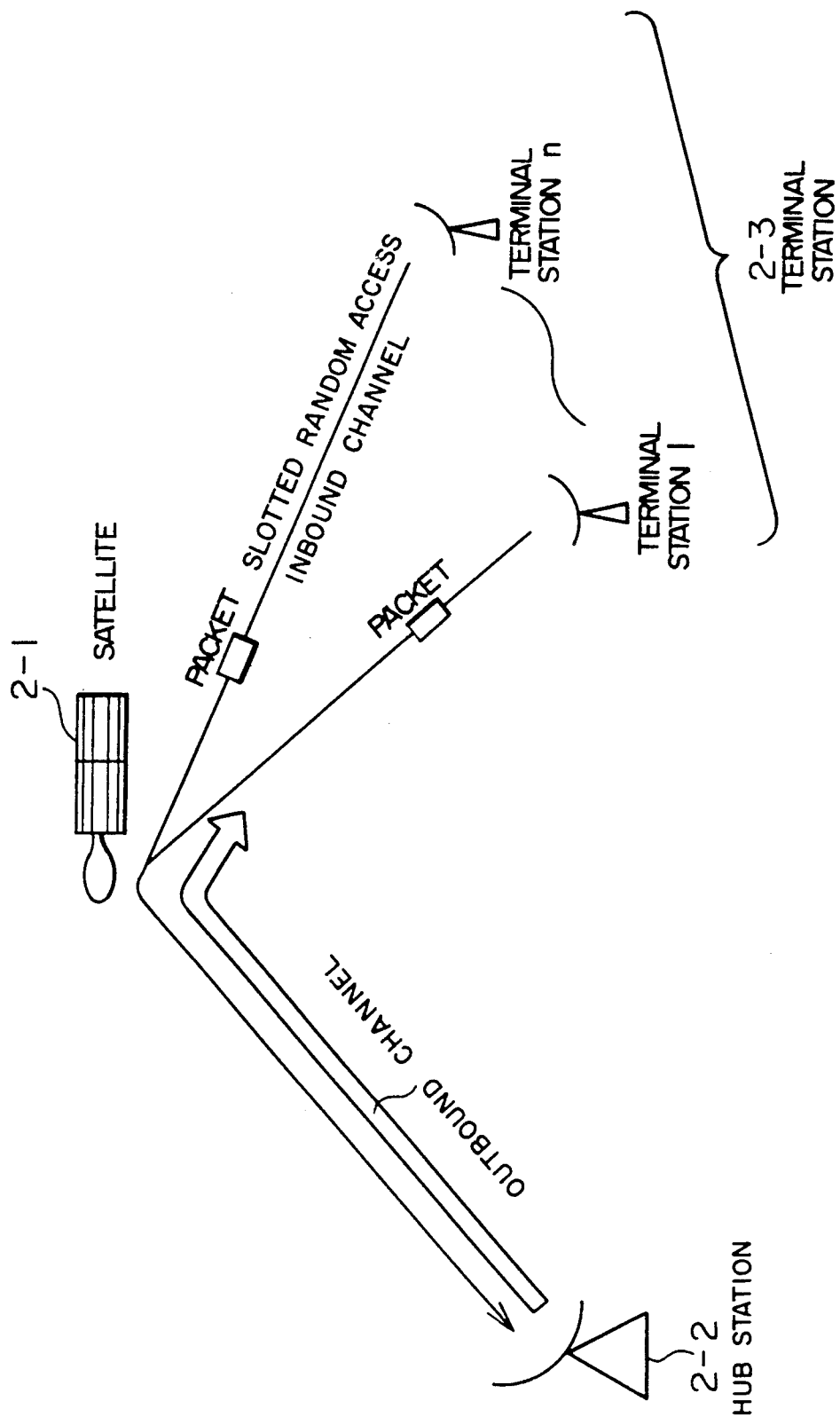
FIG. 1 is a configuration diagram of a satellite communication system to which the present invention can be applied.

First of all, the summary of a satellite communication scheme according to an embodiment of the present invention will now be described by referring to FIG. 1. The satellite communication system comprises a satellite 2-1, a hub station 2-2, and a plurality of terminal stations (1 to n) 2-3. For communication from a terminal station 2-3 to the hub station 2-2 via the satellite 2-1, both a slotted random access scheme and a reservation access scheme are used. In the slotted random access scheme, each terminal station 2-3 gains access to a satellite channel in synchronism with a time slot on the channel at random (i.e., without reservation) and transmits a packet. In the reservation access scheme, the hub station 2-2 assigns a time slot to each terminal station 2-3 on the basis of a reservation request issued from the terminal station and each terminal station 2-3 transmits a packet in synchronism with the time slot thus assigned. For communication from the hub station 2-2 to each terminal station 2-3 via the satellite 2-1, on the contrary, a time division multiplex scheme is used. In the time division multiplex scheme, the hub station multiplexes transmission data destined to respective terminal stations 2-3 and transmits the transmission data in a broadcast mode, whereas each terminal station 2-3 selects and extracts only data destined to its own station.

Configuration of the hub station 2-2 and configuration of each terminal station 2-3 are shown in FIG. 4 and FIG. 5, respectively.

Figure 2:
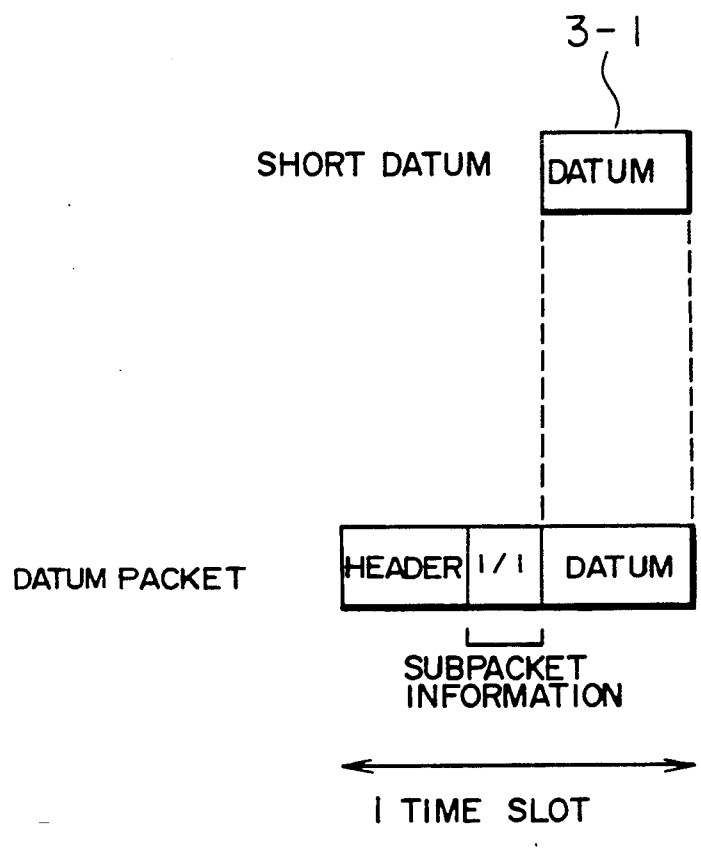
FIGS. 2, 3A and 3B show transmission packet data used in the present invention.
Figure 3A:
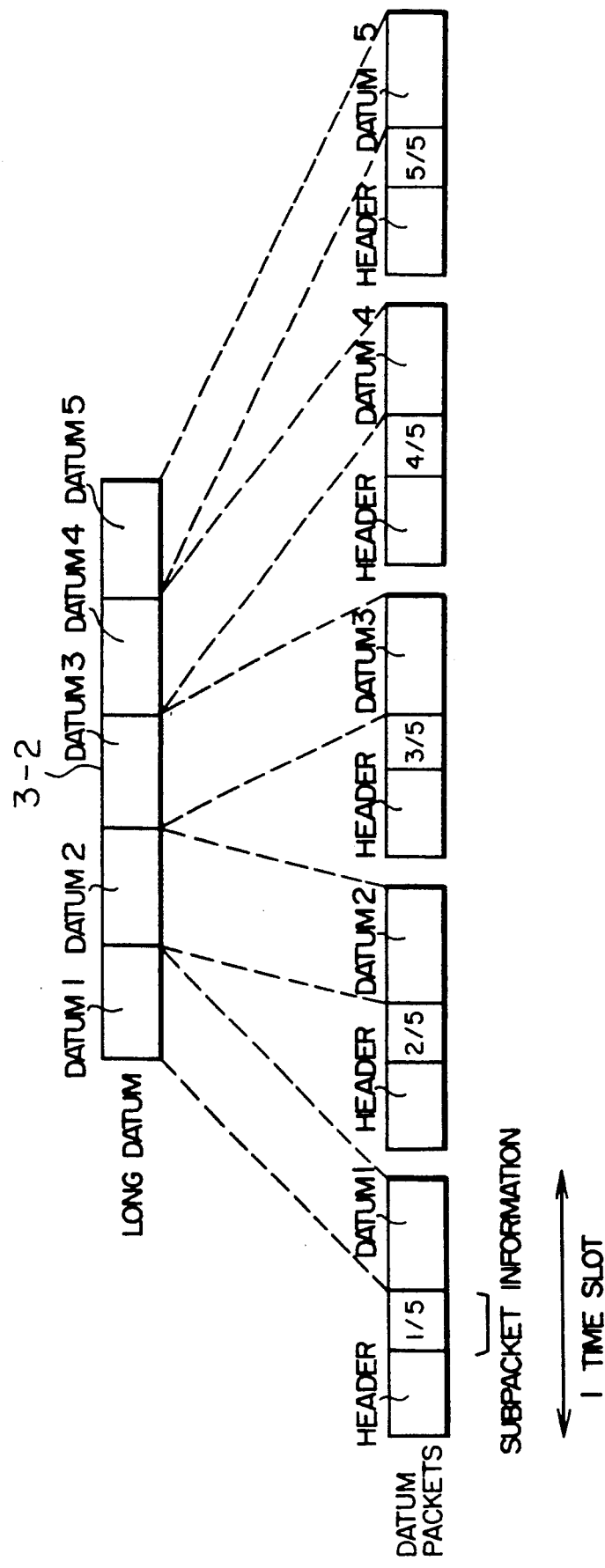

As shown in FIG. 2, a short datum 3-1 transmitted from each terminal station 2-3 to the hub station 2-2 is supplied with a header comprising its own station address and subpacket information 1/1 (where the denominator represents the number of subpackets resulting from division, and the numerator represents a subpacket sequential number. The same representation method is hereafter used.) As a result, one packet having length of one time slot is formed. As shown in FIG. 3A, however, a long datum (block 21 of FIG. 11) exceeding one time slot when it is converted into a packet is divided. Each of the resultant data is supplied with a header and subpacket information to form a subpacket (block 22 of FIG. 11). In the present embodiment, a long datum is divided into 5 segments, and each segment is supplied with a header and subpacket information 1/5, 2/5, 3/5, 4/5 or 5/5 to form a subpacket (block 22 of FIG. 11).

Figure 3B:
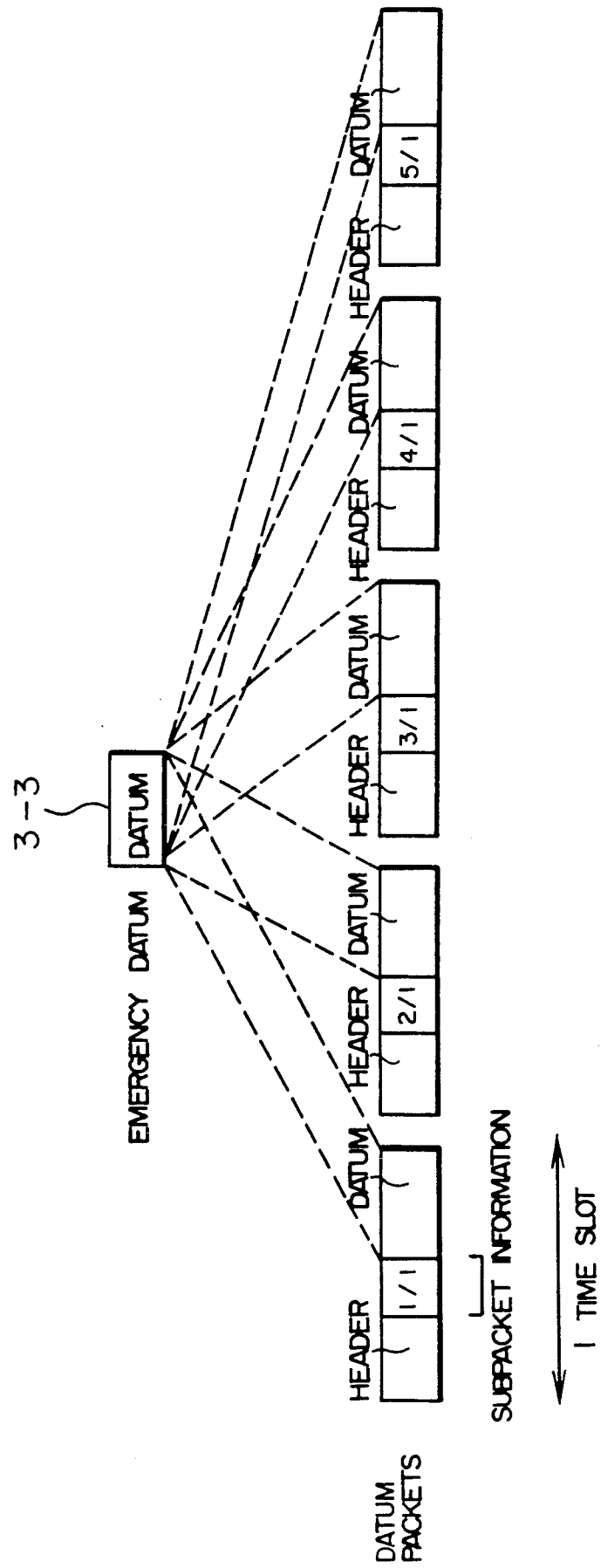
Figure 11:
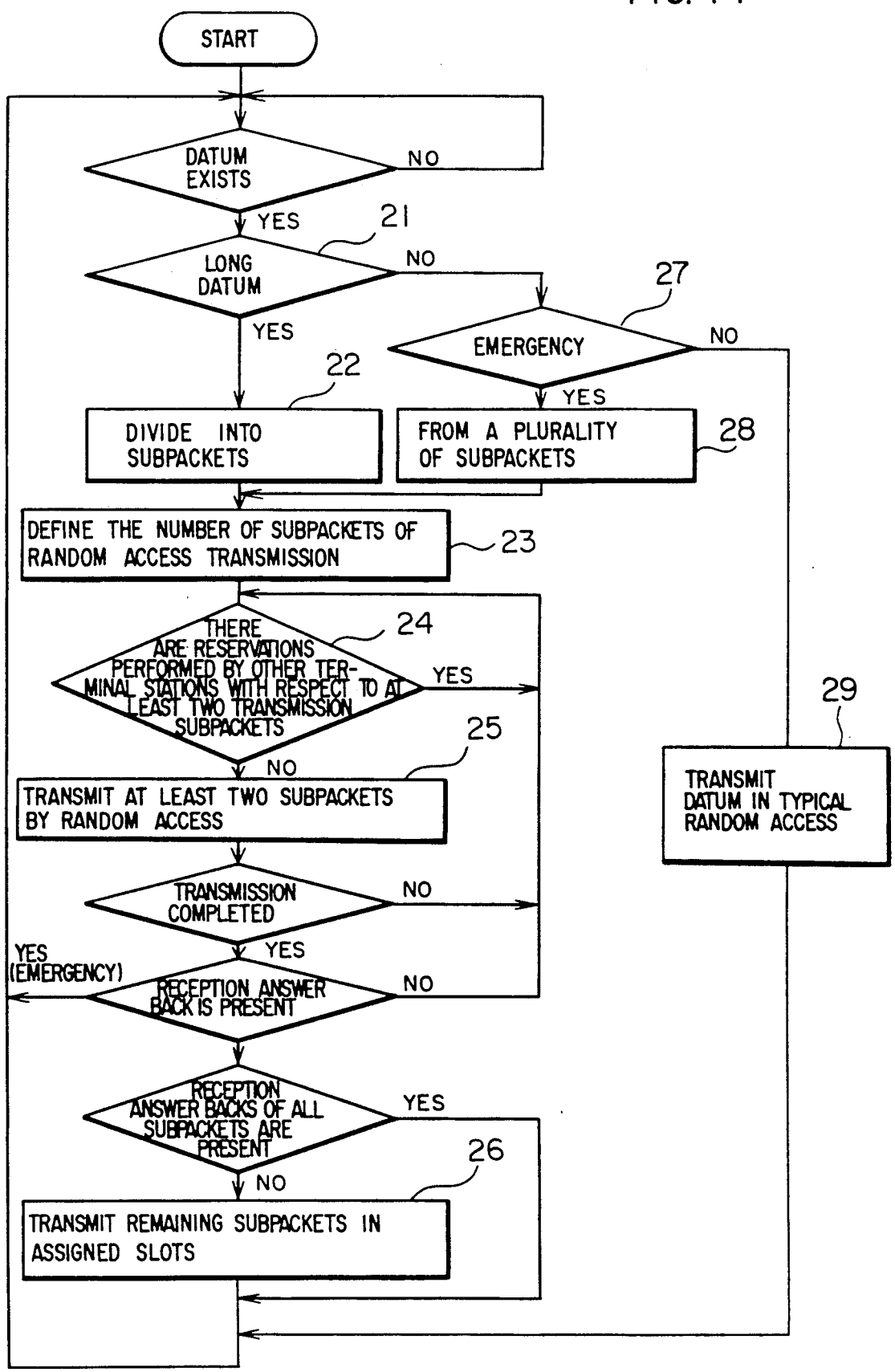
FIG. 11 is a flowchart showing subpacket transmission operation of a terminal station.

When there is a short datum 3-3 to be delivered emergently as shown in FIG. 3B (block 27 of FIG. 11), the datum is copied 4 times to produce 5 short data having identical contents in the present embodiment (block 28 of FIG. 11). Each datum is supplied with a header and subpacket information 1/1, 2/1, 3/1, 4/1 or 5/1, resulting in a subpacket.

FIG. 4 is a block diagram showing the configuration of the hub station 2-2. The hub station 2-2 comprises transmitting and receiving equipment 4-1 for transmitting/receiving data to/from the terminal station 2-3 via the satellite by means of a radio wave, a reference timing generating section 4-2 for providing the terminal station 2-3 with reference timing of a data transmission and reception by collecting a predetermined number of time slots which are time units for preventing collision of data (packets) on the satellite 2-1 to form one frame and generating and transmitting a frame signal to the terminal station 2-3, a receiving section 4-3 for performing reception processing of a transmission packet transmitted from the terminal station 2-3 and received and outputted by the above described transmitting and receiving equipment 4-1 and for outputting a packet correction signal, a received packet signal and subpacket information, a host interface receiving section 4-4 for performing sequence control of terminal data (packet) transmitted from the terminal station 2-3 and received by the receiving section 4-3 and for buffering the terminal data to output it to a host computer as reception data, a traffic control section 4-5 for outputting a traffic status signal by supervising the number of packets transmitted from each terminal station 2-3 on the basis of the output of the above described receiving section 4-3 and for outputting a traffic control signal to control the number of packets, an answer back generating section 4-6 for receiving the subpacket information and the packet correction signal from the above described receiving section 4-3 and for outputting an acknowledge (ACK) signal or a negative acknowledge (NAK) signal for each of the received packets, an assignment signal generating section 4-7 for receiving the subpacket information and the packet correction signal from the above described receiving section 4-3 to determine the necessity of the time slot reservation, for calculating the number of required time slot reservation, provided that reservation is necessary, for outputting the number thus calculated as a time slot assignment signal, and for outputting an assigned time slot signal relating to an assigned time slot within one frame on the basis of a result of the above described determination and calculation, a host interface transmitting section 4-8 for serving as a buffer to receive transmission data transmitted from the host computer to each terminal station 2-3, a multiplexing section 4-9 for applying time division multiplexing to outputs of the host interface transmitting section 4-8, the above described reference timing generating section 4-2, the traffic control section 4-5, the answer back generating section 4-6 and the assignment signal generating section, and a transmitting section 4-10 for transmitting the multiplexed output of the multiplexing section 4-9 to each terminal station 2-3 via the transmitting and receiving equipment in a broadcasting mode.

FIG. 5 is a block diagram showing the configuration of a terminal station 2-3. The terminal station 2-3 comprises transmitting and receiving equipment 5-1 for transmitting/receiving data to/from the hub station 2-2 via the satellite 2-1 by means of a radio wave, a receiving section 5-2 for receiving transmission data transmitted from the hub station 2-2 and received and outputted by the transmitting and receiving equipment and for extracting and separating, out of the transmission data, the aforementioned frame signal, the aforementioned traffic status signal, the aforementioned traffic control signal, the aforementioned acknowledge (ACK) signal or negative acknowledge (NAK) signal, the aforementioned time slot assignment signal, the aforementioned assigned time slot signal and the transmission data transmitted from the host computer, a transmission timing generating section 5-3 for establishing and maintaining frame synchronization in synchronism with a frame signal outputted from the receiving section 5-2 and for generating a transmission time slot timing signal indicating each of the time positions of a predetermined number of transmission time slots disposed in a frame, a terminal interface receiving section 5-4 for serving as a buffer to output and transmission data transmitted from the host computer and outputted from the aforementioned receiving section 5-2, a slot administrating section 5-5 for receiving the aforementioned time slot assignment signal and the aforementioned assigned time slot signal outputted from the receiving section 5-2 and for generating an assignment time slot signal indicating a time slot number assigned to its own station by reservation and an idle time slot signal indicating an idle time slot number which has not been reserved by other terminal stations (block 24 of FIG. 11), a traffic control section 5-6 for receiving the aforementioned traffic status signal and the aforementioned traffic control signal from the aforementioned receiving section 5-2 and for outputting a packet retransmission maximum delay time signal, an emergency transmission allowable degree signal and the number of subpackets control signal with regard to the transmission priority order assigned to its own station and with regard to a packet retransmission number signal and a packet retransmission times number signal supplied from a packet control section 5-12 and a subpacket control section 5-13 which will be described later, a packet buffer 5-7 for saving a short datum having a length of one time slot or less when converted into a packet, a subpacket buffer 5-8 for dividing a long datum having a length of 2 time slots or more into subpackets each having a length of one time slot to save the subpackets and for copying a short datum having a length of one time slot to be emergently delivered to save the short datum as a plurality of subpackets, a terminal interface transmitting section 5-9 serving as a buffer to receive data transmitted from a terminal to the hub station 2-2, an emergency degree discriminating section 5-10 for discriminating an emergency datum out of the transmission data, for copying the emergency datum by the number of times defined on the basis of the aforementioned emergency transmission allowable degree signal supplied from the traffic control section 5-6, and for adding a header and subpacket information described before by referring to FIG. 3A to each copy to form a packet, a data length discriminating section 5-11 for receiving the transmission datum from the aforementioned terminal interface transmitting section 5-9 to discriminate its data length, for adding a header and subpacket information 1/1 described before by referring to FIG. 2 to a datum to form a packet and transfer the packet to the aforementioned packet buffer 5-7 provided that the datum is a short datum, and for, in case of a long datum, dividing the transmission datum into subpackets to add a header and subpacket information to each of the subpackets to form a packet and transfer the packet to the aforementioned subpacket buffer 5-8, a packet control section 5-12 for controlling the transmission of a short datum converted into a packet and for controlling retransmission on the basis of the aforementioned acknowledge (ACK) signal for negative acknowledge (NAK) signal supplied from the receiving section 5-2 and the aforementioned packet retransmission maximum delay time signal supplied from the traffic control section 5-6, a subpacket control section 5-13 for controlling the number of subpackets to be first transmitted by means of a slotted random access scheme on the basis of the aforementioned number of subpackets control signal supplied from the traffic control section 5-6, for performing retransmission control on the basis of the aforementioned acknowledge (ACK) signal or negative acknowledge (NAK) signal supplied from the receiving section 5-2 and the aforementioned packet retransmission maximum delay time signal supplied from the traffic control section 5-6, and for controlling transmission of a subpacket which is contained in a series of subpackets and which does not yet arrive at the hub station 2-2, a packet transmitting section 5-14 for reading out a packet from the aforementioned packet buffer 5-7 or a subpacket from the aforementioned subpacket buffer 5-13, for inserting the subpacket or packet thus read out into a time slot specified by the assignment time slot signal supplied from the aforementioned slot administrating section 5-5, for inserting a subpacket waiting time slot assignment in the aforementioned subpacket buffer 5-8 into the assigned slot supplied from the aforementioned slot administrating section 5-5, and for transmitting the packet or subpacket in synchronism with the transmission time slot timing signal supplied from the aforementioned transmission timing generating section 5-3, and a transmitting section 5-15 for transmitting the packet or subpacket sent out from the packet transmitting section 5-14 to the aforementioned transmitting and receiving equipment 5-1 (block 25 of FIG. 11).

A procedure of the satellite communication scheme according to the present invention will now be described by referring to FIGS. 6A and 6B. The present invention relates to an access scheme of a terminal station gaining access to the hub station by using a slotted random access scheme. Since the slotted random access scheme itself is described in the aforementioned literature written by N. Abramson, however, it will not be described. A part of the scheme relating to the present invention will be mainly described.

Figure 6A:
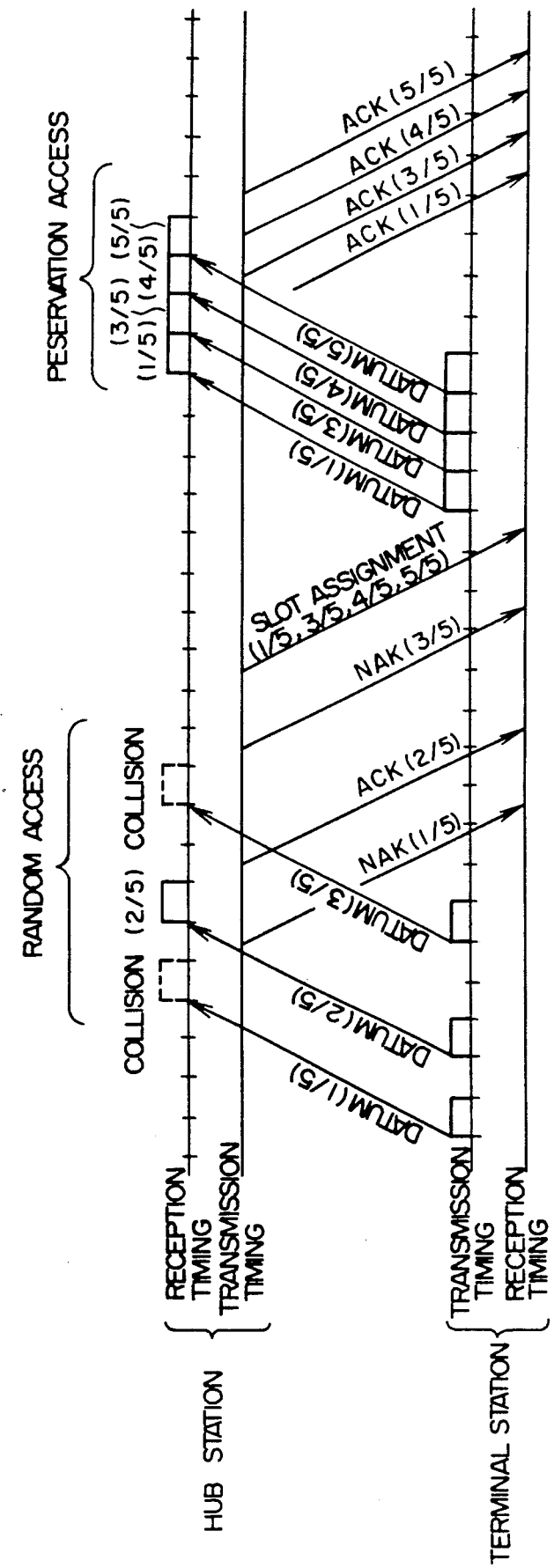

Assuming now that a long datum which needs 5 time slots when it is divided and converted into packets as shown in FIG. 3A is to be sent from a terminal station to the hub station, an embodiment of communication procedure according to the present invention making faster transmission possible in the slotted random access scheme is shown in FIG. 6A. When the long datum is received by the terminal interface transmitting section 5-9 of the terminal station 2-3, it is discriminated by the data length discriminating section 5-11 that the datum is a long datum. Otherwise, see block 29 in FIG. 11. As shown in FIG. 3A, the long datum is divided into five data comprising the datum 1, datum 2, datum 3, datum 4 and datum 5. Each datum is supplied with a header such as its own station address and subpacket information 1/5, 2/5, 3/5, 4/5 or 5/5, where the denominator represents the number of subpackets and the numerator represents the sequential number of the subpacket. Five resultant subpackets are transmitted to the subpacket buffer 5-8 (blocks 24 and 25 of FIG. 11).

The number of subpackets to be first transmitted by means of the slotted random access scheme is defined to be three in the subpacket control section 5-13 on the basis of the aforementioned number of subpacket control signal, which is in turn produced by the traffic control section 5-6 on the basis of the traffic status signal and the traffic control signal transmitted from the hub station and received by the receiving section 5-2. That is to say, three subpackets having subpacket information 1/5, 2/5 or 3/5 are defined to be transmission subpackets which should be transmitted at the beginning of one set.

In the packet transmitting section 5-14, three idle time slots are randomly found out on the basis of the idle time slot signal supplied from the slot administrating section 5-5. Three subpackets of the one set are inserted into the idle time slots and transmitted successively in accordance with the transmission time slot signal produced by the transmission time slot timing signal.

Since three subpackets of the one set are transmitted to the hub station by means of the slotted random access scheme, there is a possibility that the subpackets may collide with packets or subpackets transmitted from another terminal station in the same time slots as those used by the three subpackets. In the present embodiments, subpackets each having subpacket information 1/5 or 3/5 are not successfully received at the hub station due to collision. The subpacket having subpacket information 2/5 is successfully received at the hub station without collision. In the hub station, NAK (1/5) and NAK (3/5) are respectively produced by the answer back generating section 4-6 as negative acknowledge signals with respect to subpackets which could not be normally received. As an acknowledge signal with respect to a subpacket which could be normally received, ACK (2/5) is produced by the answer back generating section 4-6. The transmitting terminal station address is added to the negative acknowledge signals and the acknowledge signal. The resultant signals are transmitted to the terminal station in the broadcasting mode. Since only the subpacket having the subpacket information 2/5 could be successfully received, a time slot assignment signal for assigning four time slots to transmission (block 26 of FIG. 11) of four subpackets respectively having subpacket information 1/5, 3/5, 4/5 and 5/5 is produced by the above described assignment signal generating section 4-7 and transmitted to the terminal station in the broadcasting mode.

In the terminal station, the time slot assignment signal received, separated and outputted in the receiving section 5-2 is decoded by the aforementioned slot administrating section 5-5 and outputted to the aforementioned packet transmitting section 5-14 as the assignment time slot signal. In the packet transmitting section 5-14, subpackets respectively having subpacket information 1/5, 3/5, 4/5 and 5/5 are read out from the subpacket buffer 5-8, inserted into respective time slots according to the assignment time slot signals and transmitted. Since in this case time slots assigned to exclusive use are used for transmission, subpackets can be surely delivered without collision. If the four packets are successfully received by the receiving section 4-3 in the hub station via the transmitting and receiving equipment 4-1, datum (1/5) to datum (5/5) undergo data sequence control and buffering in the host interface receiving section 4-4 and are outputted to the host computer.

FIG. 6B shows an embodiment of a communication procedure according to the present invention. In the present embodiment, an emergency datum is copied to form five subpackets as shown in FIG. 3B and the five subpackets are transmitted more surely from a terminal station to the hub station by means of the slotted random access scheme. When the emergency datum is received by the terminal interface transmitting section 5-9, it is discriminated in the emergency degree discriminating section 5-10 that the datum is an emergency datum, and the number of copies is defined to be 4 on the basis of the emergency transmission allowable degree signal produced by the traffic control section 5-6 on the basis of the traffic status signal and the traffic control signal transmitted from the hub station and received by the receiving section 5-2. As shown in FIG. 3B, the emergency datum is copied four times. Each of five emergency data in total is supplied with a header such as its own station address and subpacket information 1/1, 2/1, 3/1, 4/1 or 5/1, where the denominator is 1 and the numerator is the subpacket sequence number. Five resultant subpackets are transmitted to the subpacket buffer 5-8.

In the subpacket control section 5-13, it is determined that the appropriate number of subpackets which can be first transmitted in the slotted random access scheme is five on the basis of the aforementioned number of subpackets control signal produced by the traffic control section 5-6 on the basis of the traffic status signal and the traffic control signal transmitted from the hub station and received by the receiving section 5-2. In the packet transmitting section 5-14, five idle time slots are found out randomly on the basis of the idle time slot signal supplied from the slot administrating section 5-5. The five subpackets are inserted into the idle time slots and are transmitted successively in accordance with the transmission time slot timing signal produced by the transmission timing generating section 5-3.

Since the above described five subpackets for emergency data transmission are transmitted to the hub station by means of the slotted random access scheme, there is a possibility that the subpackets may collide with packets or subpackets transmitted from another terminal station in the same time slots as those used by the subpackets. In the present embodiment, subpackets respectively having subpacket information 1/1, 2/1, 3/1 and 5/1 are not successfully received at the hub station due to collision. However, the subpacket having subpacket information 4/1 is successfully received at the hub station without collision, and hence the emergency information reaches the hub station in a short time without performing retransmission at the terminal station.

In the hub station, NAK (1/1), NAK (2/1), NAK (3/1) and NAK (5/1) are respectively produced by the answer back generating section 4-6 as negative acknowledge signals with respect to subpackets which could not be successfully received. As an acknowledge signal with respect to a subpacket which could be normally received, ACK (4/1) is produced by the answer back generating section 4-6. The transmitting terminal station address is added to the negative acknowledge signals and the acknowledge signal. The resultant signals are transmitted to the terminal station in the broadcasting mode. By the aforementioned acknowledge signal, the terminal station knows that at least one of emergency data copied and transmitted in five subpackets has arrived and terminates the emergency datum transmission processing. When an emergency datum is to be transmitted, a plurality of copied subpackets are thus transmitted to raise the probability that at least one of the subpackets can be successfully received at the hub station. Thereby, the delivery time can be shortened as compared with a case where one emergency datum is transmitted.

Figure 7A:
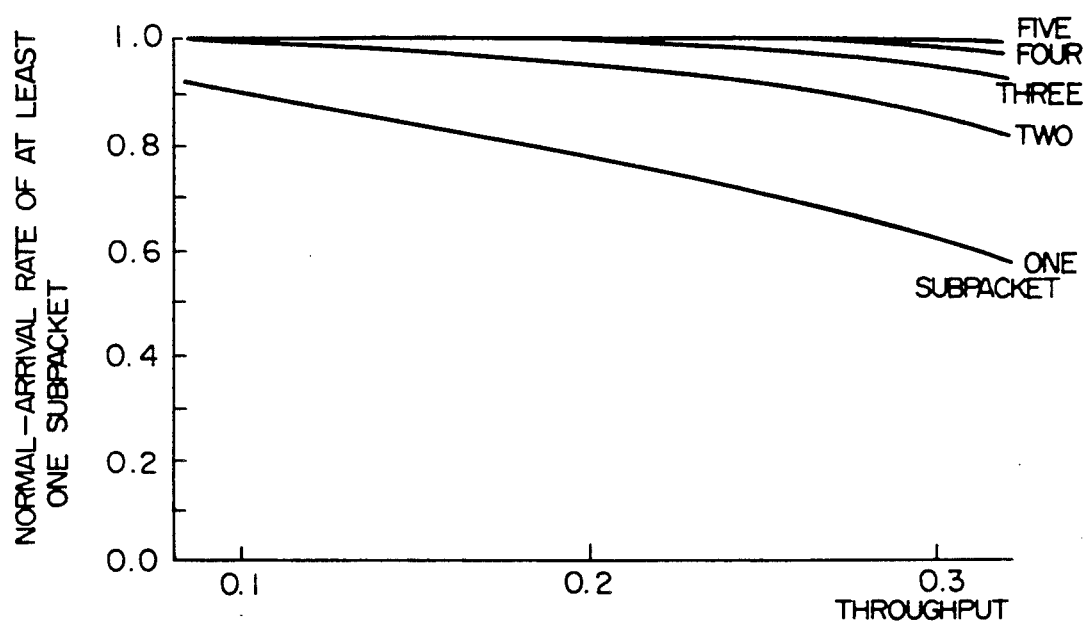
FIGS. 7A and 7B show relations between throughput and a packet arrival probability of packet arrival rate.
Figure 7B:
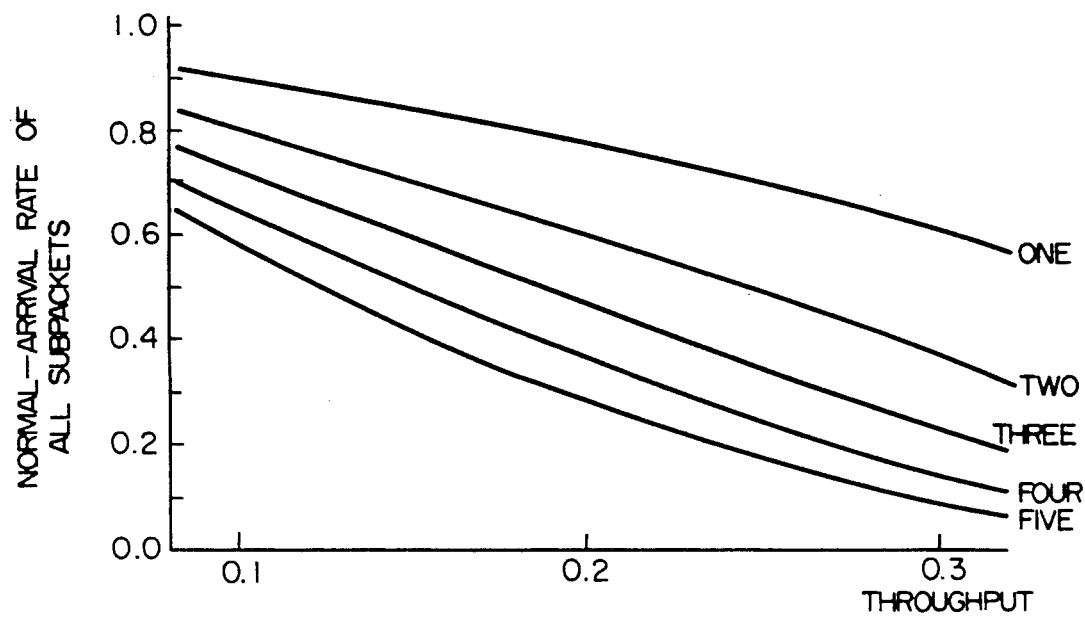

FIGS. 7A and 7B show the effect obtained when one to five subpackets are transmitted in FIGS. 6A and 6B.

Assuming now that the satellite line has a quality free from error, FIG. 7A shows relationship between the throughput of a slotted random access scheme (abscissa) and a probability (ordinate) such that at least one subpacket can be normally received at the hub station without collision when one to five subpackets are transmitted in the access scheme.

Assuming now that the satellite line has a quality free from error, FIG. 7B shows a relationship between the throughput of a slotted random access scheme (abscissa) and probability (ordinate) such that all subpackets can be successfully received at the hub station when one to five subpackets are transmitted in the access scheme.

Assuming now that the throughput is 0.3 and three subpackets are transmitted as shown in FIG. 6A, the probability that at least one of the three subpackets is successfully received at the hub station and the time slot reservation for transmission of remaining subpackets is performed becomes 0.94. This value is considerably higher than 0.61, which is the probability obtained when only one subpacket is transmitted. Assuming that all of the five subpackets are transmitted collectively at the beginning by means of the slotted random access scheme, the probability that all of the five subpackets are successfully received at the hub station without collision is as low as 0.09. However, the probability that at least one of the five subpackets is successfully received and time slots for the remaining subpackets are reserved is 0.99, which is close to 1.0. It is thus understood that reservation can be surely made.

Assuming now that the throughput is 0.1 and three subpackets are transmitted as shown in FIG. 6A, the probability that at least one of the three subpackets is normally received at the hub station and time slots for the remaining subpackets are reserved is 0.99, which is higher than the value 0.89 of probability obtained when only one subpacket is transmitted. Even if all of the five subpackets are collectively transmitted at the beginning by means of the slotted random access scheme when the throughput is thus low, the probability that all of the five subpackets are normally received at the hub station without collision is as comparatively high as 0.58. If the transmission is attempted, say, 10 times, all of the five subpackets are normally successfully at the hub station by a single reservation without reservation nearly 6 times out of the 10 times. It thus becomes possible to shorten the delivery time.

If a datum is divided into subpackets and transmitted as a plurality of subpackets, the probability that at least one subpacket is successfully received at the hub station is significantly higher than the probability that the datum is transmitted as a single packet and successfully received at the hub station. The effect becomes more significant as the throughput is raised. Assuming now that all of a series of subpackets are collected together at once and transmitted by means of a slotted random access scheme, the probability that all of the subpackets are successfully received the hub station becomes higher as the throughput is lowered. The data delivery time from the terminal station to the hub station can be expected accordingly. Even if all of the packets cannot be normally received at the hub station in this case, the probability that at least one subpacket is successfully received is very high as described before. Therefore, the probability time the time slot reservation for the remaining subpackets is made is high. As a result, shortening of the data delivery time as compared with the case where only one packet is transmitted for reservation can be sufficiently anticipated.

Figure 8:
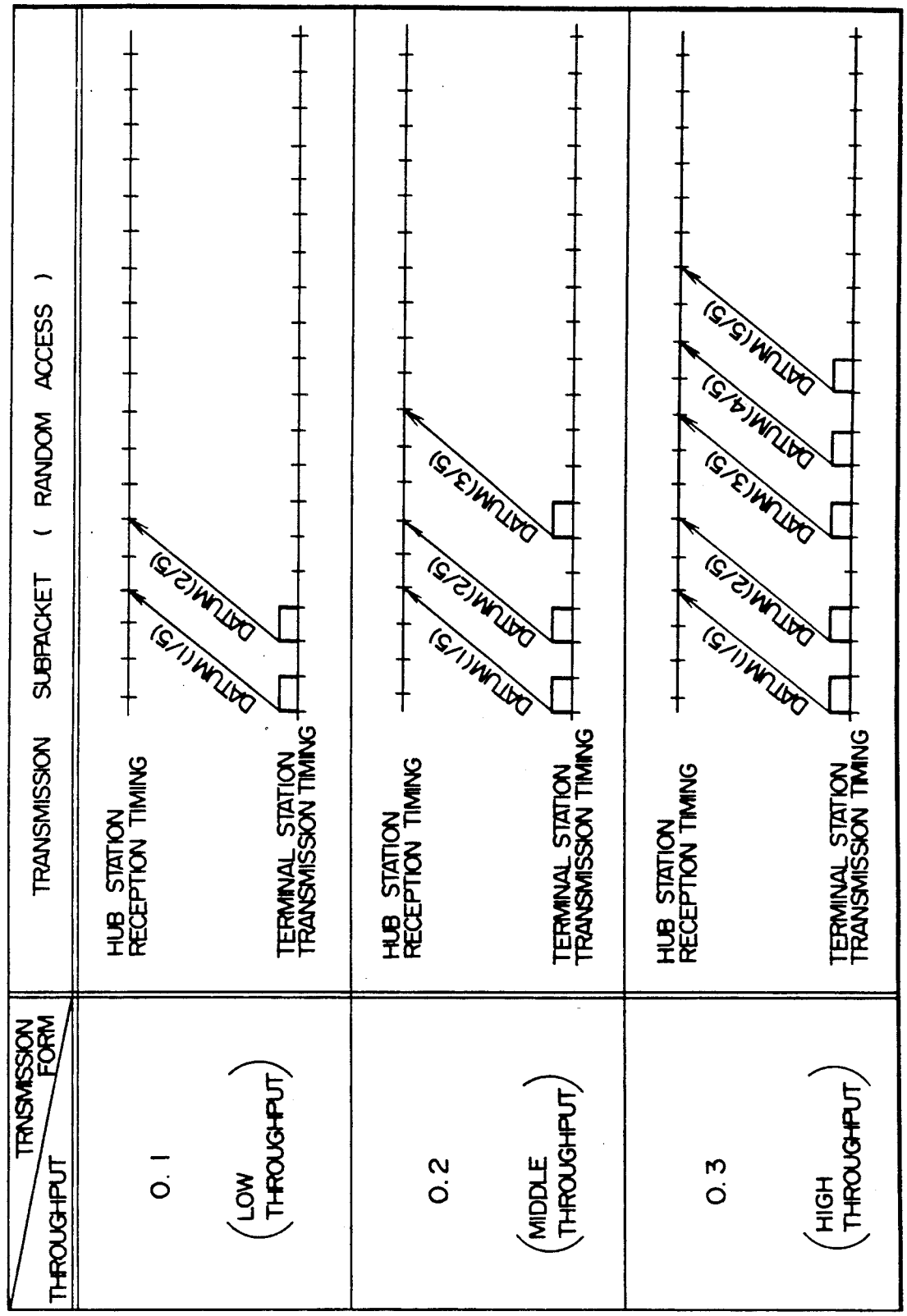
FIGS. 8 and 9 are diagrams used for explaining a transmission scheme according to the degree of throughput.

On the basis of simulation results shown in FIG. 7B, FIG. 8 shows a subpacket transmission performed when at least one subpacket is normally received at the hub station with a probability of approximately 0.99 for throughputs of 0.1, 0.2 and 0.3.

When the throughput is as low as approximately 0.1, at least one subpacket is normally received at the hub station with a probability of 0.99 by transmitting two subpackets alone. When the throughput has a middle value of approximately 0.2, at least one subpacket is normally received at the hub station with a probability of 0.99 by transmitting three subpackets. When the throughput is as high as approximately 0.3, at least one subpacket is normally received at the hub station with a probability of 0.99 by transmitting five subpackets.

As evident from the foregoing description, at least one subpacket is normally received at the hub station with a probability of 0.99, and reservation of remaining subpackets is surely made by adjusting the number of subpackets transmitted collectively at the beginning by means of the slotted random access scheme according to the throughput of a communication line extending from the terminal station to the hub station.

Figure 9:
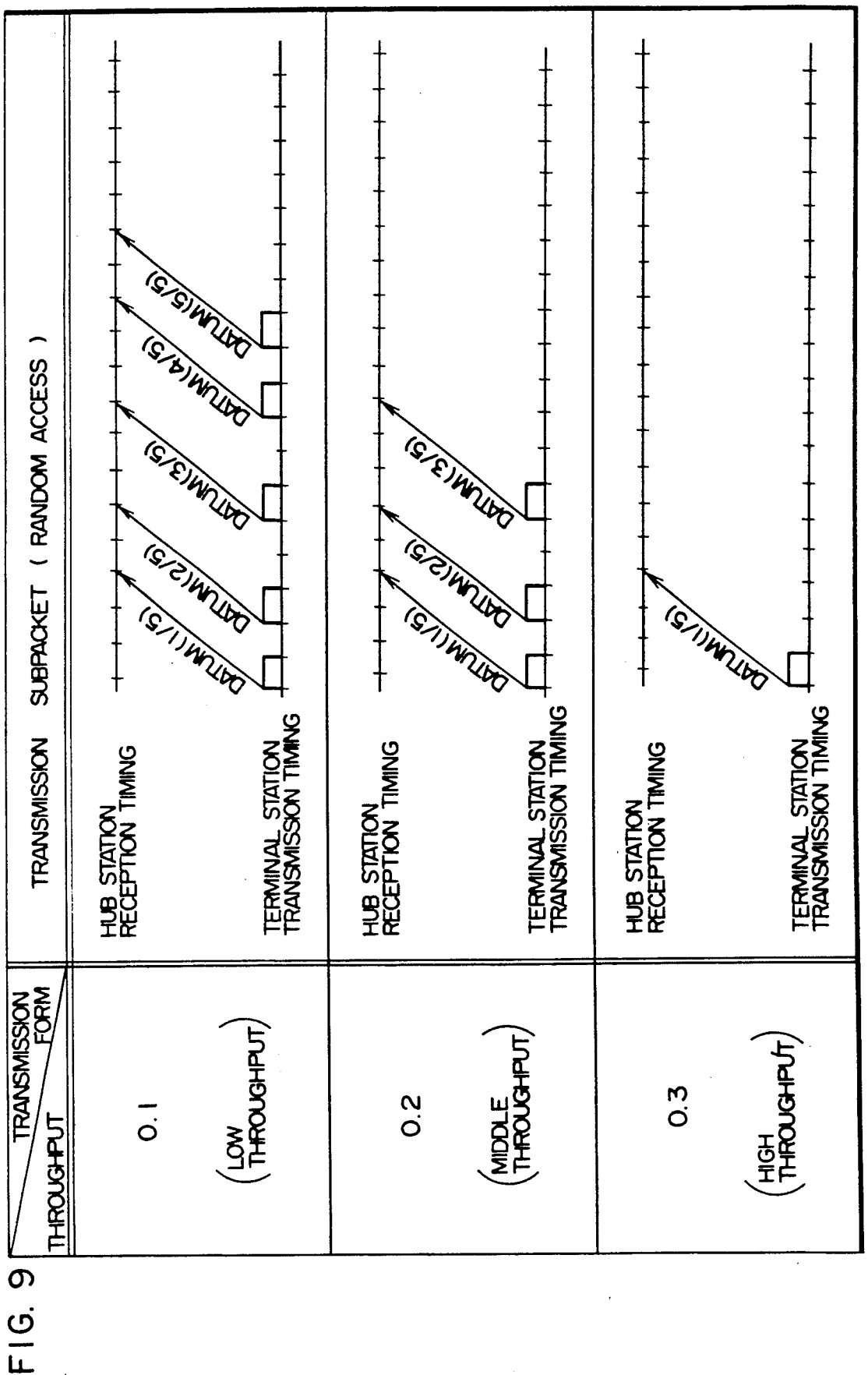

A description of FIG. 8 is made on the premise that the total number of the aforementioned transmission subpackets is small and hardly affects the throughput of the communication line extending from the terminal station to the hub station. In case respective terminal stations operate in accordance with identical algorithm and there is a possibility that the total number of transmission packets transmitted from a terminal station affects the throughput more or less, a working form as shown in FIG. 9 may also be used. When the throughput is low, a large number of subpackets are collectively transmitted at the beginning by means of the slotted random access scheme because the total number of the transmission packets is small. When the throughput is high, only one subpacket is transmitted in the same way as in the prior art so that the throughput may not be largely affected.

Figure 10:
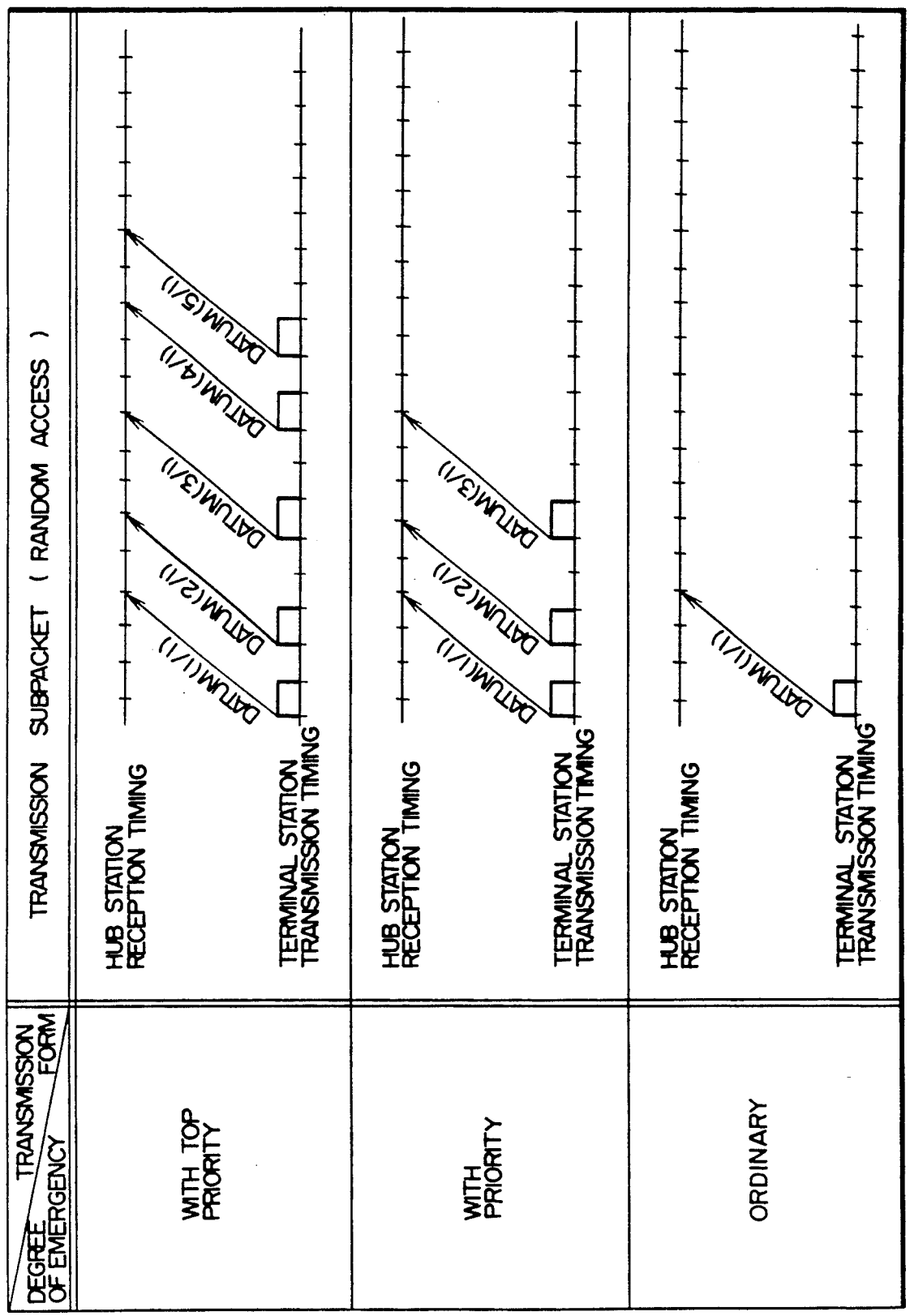
FIG. 10 is a diagram used for explaining a transmission scheme of an emergency datum.

FIG. 10 shows a working form in the case where an emergency datum is transmitted from a terminal station.

When the degree of emergency is "with top priority", five subpackets produced by copying are transmitted as shown in FIG. 3B, for example. Because it is sufficient that at least one subpacket is normally received at the hub station in this case, its probability is not less than 0.99 as shown in FIG. 7A whether the throughput be 0.1 or 0.3. An emergency datum can be delivered with rear surety.

When the degree of emergency is "with priority", three subpackets produced by copying are transmitted, for example. In this case, the probability that at least one subpacket is normally received at the hub station becomes 0.99 at a throughput of 0.1 and 0.94 at throughput of 0.3. Although the probability is inferior to that in "with top priority", an emergency datum can be delivered with rear surety in this case as well.

By changing the number of subpackets produced by copying according to the throughput and the degree of the transmission emergency of an emergency datum as heretofore described, the emergency datum can be delivered to the hub station with surety.

FIG. 11 is a flowchart showing the subpacket transmission operation of a terminal station.

I claim:

1. A terminal station for satellite communication comprising:

first means for dividing a packet datum having a length of at least two time slots to be transmitted to a hub station into packet data which each have a length of one time slot and for holding the packet data;

second means for adding a header and subpacket information indicating a sequential number of one of the packet data to each of the packet data held in said first means to form a subpacket;

third means for transmitting subpackets produced by said second means to the hub station one at a time or a plurality of subpackets at a time;

fourth means for receiving a signal indicating a traffic quantity representative of traffic loading from the hub station;

fifth means for producing and holding at least one copy of one of the packet data to be transmitted emergently to the hub station;

sixth means for adding a header and subpacket information indicating a sequential datum number to each data packet copy held by said fifth means to form a subpacket; and seventh means for transmitting at least one subpacket to the hub station one at a time or a plurality of subpackets at a time.

2. A hub station for satellite communication system comprising:

first means for receiving at least one subpacket transmitted from a terminal station;

second means or discriminating a number of subpackets which are not yet received by said first means by analyzing subpacket information added to a subpacket received by said first means; and third means for permitting reservation access to said terminal station based on information discriminated by said second means.

3. A hub station for satellite communication system according to claim 2, further comprising:

fourth means for monitoring a number of subpackets transmitted from a plurality of terminal stations and for detecting a traffic quantity representative of traffic loading of data; and fifth means for transmitting the traffic quantity detected by said fourth means to each of said plurality of terminal stations as a signal.

4. A satellite communication system comprising:

(a) a plurality of terminal stations each comprising:

first means for dividing a datum having a length of at least two time slots to be transmitted via a satellite into a plurality of data which each have a length of one time slot and for holding the plurality of data;

second means for adding a header and a sequential number representing where a datum is positioned in relation to a first position of each of the plurality of data held by said first means and thereby producing a plurality of subpackets; and third means for transmitting said plurality of subpackets; and (b) a hub station comprising:

fourth means for receiving subpackets transmitted from a first one of the terminal stations;

fifth means for discriminating a number of subpackets which are not yet received by said fourth means by analyzing sequential information added to the subpackets received by said fourth means; and sixth means for permitting reservation access with respect to said first terminal station based on discrimination information supplied from said fifth means, wherein said first terminal station comprises seventh means for transmitting subpackets produced by said second means one by one or based on reservation access permitted by said sixth means to said hub station.

5. In a satellite communication system including a hub station and a plurality of terminal stations, wherein said hub station includes:

first means for receiving at least one subpacket transmitted from at least one of said terminal stations;

second means or discriminating a number of subpackets which are not yet received by said first means from said at least one terminal station by analyzing subpacket information added to a subpacket received by said first means;

third means for permitting reservation access to said at least one terminal station based on information discriminated by said second means;

fourth means for monitoring the number of subpackets transmitted from said plurality of terminal stations and for detecting a traffic quantity representative of traffic loading of data transmitted from all of said plurality of terminal stations to said hub stations; and fifth means for transmitting the traffic quantity detected by said fourth means to each of said plurality of terminal stations as a signal; a satellite communication method comprising the steps of:

detecting at said at least one terminal station the traffic quantity representative of traffic loading of data transmitted from all of the plurality of terminal stations to the hub station, said traffic quantity being returned to said at least one terminal station by the hub station; and controlling a number of copies of an emergency datum according to said traffic quantity.

6. A satellite communication method according to claim 5, further comprising the steps of:

converting a packet datum transmitted from each terminal station to the hub station into subpackets which each have a predetermined slot length;

transmitting a first predetermined number of subpackets or only one subpacket included in said converted subpackets to the hub station when the traffic quantity is below a predetermined level; and collecting together and transmitting a second predetermined number of subpackets included in said converted subpackets when the traffic quantity is above a predetermined level, said second predetermined number being greater than said first predetermined number.

7. A satellite communication method according to claim 5, further comprising the steps of:

converting a packet datum transmitted from each terminal station to the hub station into subpackets which each have a predetermined slot length;

collecting together and transmitting a first predetermined number of subpackets included in said converted subpackets when the traffic quantity is below a predetermined level, said transmitting a second predetermined number of subpackets or only one subpacket included in said converted subpackets to the hub station when the traffic quantity is above a predetermined level, said second predetermined number being less than said first predetermined number.

8. A satellite communication method used in a system for communication between a hub station and a plurality of terminal stations via a satellite, the method comprising the steps of:

converting a packet datum into subpackets each having a predetermined slot length and transmitting the subpackets form at least one of said terminal stations to the hub station via the satellite; and transmitting from said at least one terminal station, within a time slot predetermined by said hub station, a packet to be received by said hub station when said hub station has received at least one packet datum contained in packet data which has been converted into subpackets and transmitted to said hub station.

9. A satellite communication method used in a system for communication between a hub station and a plurality of terminal stations via a satellite, the method comprising the steps of:

producing at least one copy of an emergency datum to be transmitted emergently from a terminal station to the hub station converting each copy into a packet;

transmitting at least one of said packets; and terminating communication to the hub station of the packets resulting form said converting of said emergency datum copies when the hub station has received at least one of said transmitted packets.

10. A satellite communication method used in a system for communication between a hub station and a plurality of terminal stations via a satellite, the method comprising the steps of:

discriminating a degree of emergency of a datum to be transmitted emergently from a terminal station to the hub station upon occurrence of such a datum;

producing a first predetermined number of copies of said emergency datum, converting respective copies of said first predetermined number of copies into subpackets, and transmitting the resultant subpackets when the degree of emergency is high; and maintaining said emergency datum as it is or producing only a second predetermined number of copies of said emergency datum, converting each copy of said second predetermined number of copies into a subpacket, and transmitting the resultant subpackets converted from said second predetermined number of copies when the degree of emergency is low.

11. A method of satellite communication in a star type network including a hub station and a plurality of terminal stations, the method comprising the steps of:

(a) at an origination terminal station from among the plurality of terminal stations:

dividing an accepted datum into a plurality of data having a predetermined length;

forming each of said plurality of data into a data subpacket by combining each of said plurality of data with subpacket information including an identity of a source and a destination of each of said plurality of data, a sequence number of each of said plurality of data, and a division number of said plurality of data divided from said accepted datum;

determining a number of at least two data subpackets to be transmitted to said hub station; and transmitting said data subpackets in randomly selected time slots, except for time slots which have already been reserved, before receiving an acknowledgement for a first one of said data subpackets, said time slots being periods between time references transmitted from said hub station;

(b) at said hub station:

receiving data subpackets transmitted from said origination terminal station from among the plurality of terminal stations;

storing said subpacket information and transmitting an acknowledgement signal to said origination terminal station;

calculating a number of data subpackets not received by said hub station from said origination terminal station to form a non-received data subpacket number representative of data subpackets not received by said hub station form said origination terminal station based on a sequence number of successfully received data subpackets and a division number of data subpackets resulting from division;

assigning for said data subpackets not received by said hub station from said origination terminal station a calculated number of time slots which have not been reserved; and transmitting time slot assignment information including a number of assigned time slots, a sequence number of nonreserved data subpackets and a division number to said origination terminal station; and (c) at said origination terminal station:

receiving said time slot assignment information; and retransmitting data subpackets not successfully received at said hub station to said hub station.

12. A method of satellite communication according to claim 11, further comprising the step of transmitting data subpackets which have not yet been transmitted in time slots notified in said time slot assignment information to said hub station from said origination terminal station.

13. A method of satellite communication according to claim 11, wherein said number determining step at said origination terminal station from among the plurality of terminal stations is made based on traffic loading information representative of a satellite communication traffic quantity received from said hub station.

14. A method of satellite communication in a terminal station for communicating with a hub station comprising the steps of:

dividing an accepted datum into a plurality of data having a predetermined length;

forming each of said plurality of data into a data subpacket by combining each of said plurality of data with subpacket information including an identity of a source and a destination of each of said plurality of data, a sequence number of each of said plurality of data, and a division number of said plurality of data divided form said accepted datum;

determining a number of at least two data subpackets to be transmitted to said hub station;

transmitting said data subpackets in randomly selected time slots, except for time slots which have already been reserved, before receiving an acknowledgement for a first one of said data subpackets, said time slots being periods between time references transmitted from said hub station;

receiving time slot assignment information including a number of assigned time slots, a sequence number of non-reserved data subpackets representative of a number of data subpackets not received by said hub station from an originating terminal station and a division number from said hub station; and retransmitting data subpackets not successfully received at said hub station.

15. A method of satellite communication in a star type network including a hub station and a plurality of terminal stations, the method comprising the steps carried out at one of the plurality of terminal stations of:

producing at least one copy of an accepted datum to be transmitted emergently from said terminal station to said hub station based on traffic loading information including a traffic quantity representative of traffic loading transmitted from said hub station;

forming said at least one copy of the accepted datum into at least one subpacket by combining said at least one subpacket with subpacket information including an identity of a source and a destination of said at least one subpacket, a sequence number of said at least one subpacket, and a number of said at least one copy; and transmitting a subpacket in a randomly selected time slot exclusive to a time slot notified from said hub station which has already been reserved.

16. A method of satellite communication in a star type network according to claim 15, further comprising the step of:

terminating transmission of said at least one subpacket when the hub station has received at least one subpacket containing an emergency datum.

17. A system for satellite communication in a terminal station for communicating with a hub station comprising:

means for dividing an accepted datum into a plurality of data having a predetermined length;

means for forming each of said plurality of data into a data subpacket by combining each of said plurality of data with subpacket information including an identity of a source and a destination, a sequence number of each of said plurality of data, and a division number of said plurality of data divided from said accepted datum;

means for determining a number of at least two data subpackets to be transmitted to said hub station;

means for transmitting said data subpackets in randomly selected time slots, except for time slots which have already been reserved, before receiving an acknowledgement for a first one of said data subpackets, said time slots being periods between time references transmitted from said hub station;

means for receiving time slot assignment information including a number of assigned time slots, a sequence number of non-reserved data subpackets representative of a number of data subpackets not received by said hub station from an originating terminal station, and a division number from said hub station; and means for retransmitting data subpackets not successfully received at said hub station.

* * * * *